C. H. SCHURR.
METHOD OF GENERATING WORM WHEELS.
APPLICATION FILED APR. 12, 1917.
1,329,805.
Patented Feb. 3, 1920.
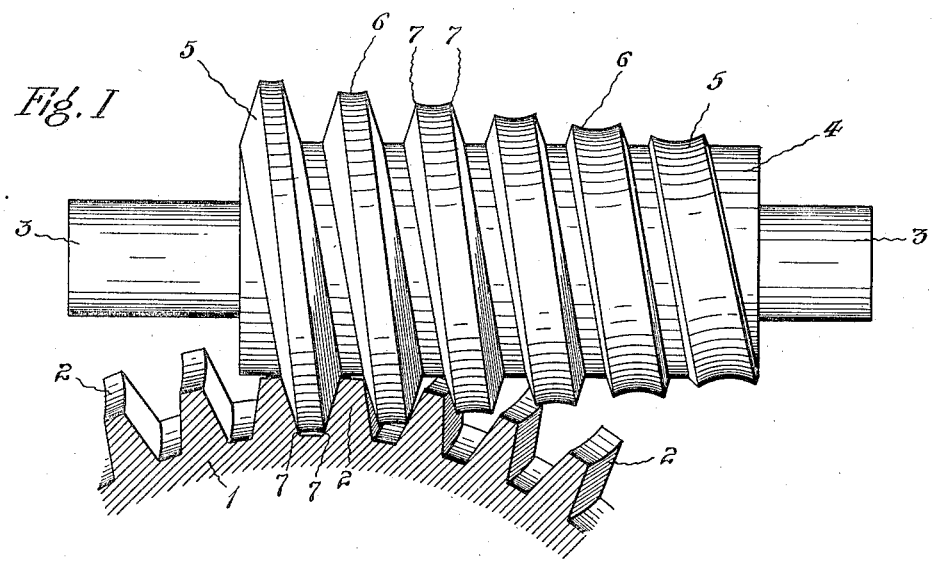
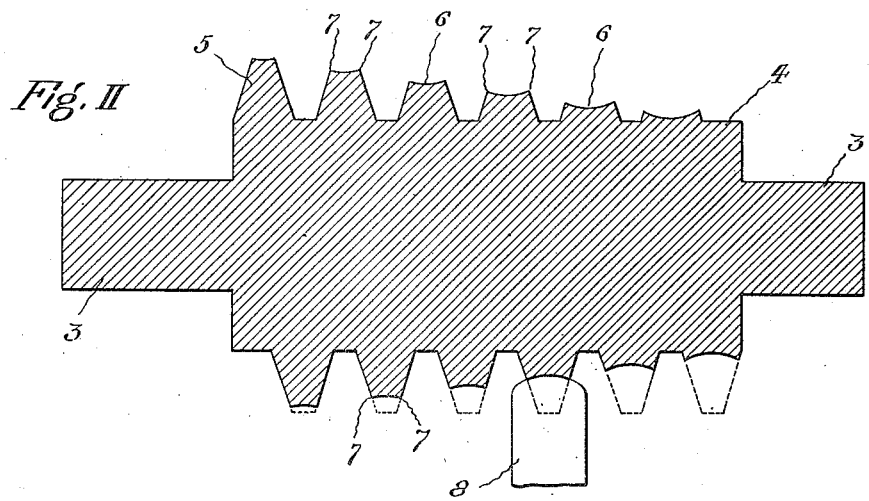
Inventor
Charles H. Schurr
by his atty.

UNITED STATES PATENT OFFICE.

CHARLES H. SCHURR, OF CLEVELAND, OHIO, ASSIGNOR TO THE LEES-BRADNER COMPANY, OF CLEVELAND, OHIO.

METHOD OF GENERATING WORM-WHEELS.

1,329,805.　　　　　　　Specification of Letters Patent.　　　Patented Feb. 3, 1920.

Application filed April 12, 1917.　Serial No. 161,492.

*To all whom it may concern:*

Be it known that I, CHARLES H. SCHURR, a citizen of the United States, residing at city of Cleveland, in the county of Cuyahoga and State of Ohio, have invented a new and useful Improvement in Methods of Generating Worm-Wheels, of which the following is a specification, the principle of the invention being herein explained and the best mode in which I have contemplated applying that principle, so as to distinguish it from other inventions.

My invention relates to the method of employing a new kind of cutting tool. More particularly I comprehend the use of a tool of the tapered worm type especially adapted to cut worm wheel teeth by a generating action.

One object of the invention is to effect an absolutely perfect cutting of the tooth faces according to the generating method in which both tooth and tool are moved into operative engagement at predetermined correlated rates of speed. Another object is to effect shearing cuts of any degree of delicacy and hence to attain a smoother finish. A further object is simultaneously to cut opposite sides of a tooth with infallible uniformity. In consequence of these objects this invention constitutes a modification of the inventions of Ernest J. Lees to whom domestic patents Number 1,168,402 of January 18, 1916, and Number 1,175,066 of March 14, 1916, were issued.

I would have it clearly understood that in using the word "spiral" in the claims I have reference to a line composed of a series of convolutions of progressively varying diameter, or to what is sometimes spoken of as an advancing spiral. I therefore distinguish the meaning of the word spiral from the meaning of the word "helical" which latter I believe defines a curve composed of duplicated convolutions all of which are of like diameter.

With the foregoing and other objects in view the invention consists of the novel mode of operation of parts as hereinafter more specifically described and illustrated in the accompanying drawings, wherein is shown one way of practising the invention, but it is to be understood that changes, variations and modifications can be resorted to which come within the scope of the claims hereunto appended.

Adverting to the drawing:

Figure I is an elevation of a tool embodying my invention showing the concluding position of its use upon a tooth of a worm gear.

Fig. II is an axial section of the same showing the manner in which another cutter is enabled to effect a symmetrical contour to the cutting edges of my novel tool.

A part of a worm gear 1 having teeth 2 is illustrated in Fig. I. As is apparent each of the teeth is thicker at the root and they all have concaved tops known as throats. The cutting tool comprises reduced ends or shanks 3 while in between the cutting edges are raised as winding lines about a bottom diameter 4 which as shown is of larger size than the shanks and substantially cylindrical.

According to the selected exemplification the tool is of the single thread type, but tapered in a peculiar manner so that what may be referred to as convolutions are formed, each gradually varying in size of outside diameter. The entire screw formation has been designated by the numeral 5. It will be noticed that the top 6 is concaved for the purpose of accentuating the pair of similar cutting edges 7. Owing to the tapered form to which the tool has been ground as by some suitable tool 8 provided with a convex end the spiral cutting edges have point intersections with any axial plane. Owing to the fact that the thread is thinner at the top, the two cutting edges diverge or become farther spaced apart along any given line parallel to the axis which latter they would intersect if continued. The cutting edges converge as they recede from the axis of the tool. Moreover, such points of intersection of the cutting edges 7 with a given axial plane of the tool are spaced like distances from such axis. It is this which enables the symmetry of cut from any adjacent pair of tooth faces of the worm wheel. The diameter and width of the bottom of the thread remains constant.

In operation the smaller end of the tool is caused to approach the worm wheel by movement parallel to the axis of the tool until it presently starts to effect compound shearing cuts progressively nearer to the axis of the wheel. Thereafter the tool passes through as suggested by the position shown in Fig. I. The shearing cuts should be understood to be rather fine and are intended to be finishing or burnishing in the smoothness of result effected. Owing to the rotations having been correlated to a true generating action, and to the progressive cutting of the edges from adjacent tooth faces, a single passage or cycle of the tool suffices.

It is to be observed that my tool is fashioned with a raised portion or convolved projection or thread of varying outermost thickness. Lying in the outer surface of said thread and coinciding as to the direction of its extent with the thread's inclination are a pair of spiral cutting edges. The two spiral cutting edges would if continued both intersect the axis of the tool, but in approaching the axis diverge relatively to each other. They therefore converge as they recede from the axis. Clearly, the edges 7 define the extreme outer periphery of the thread. By the word "convolution" is meant one full turn about the axis of the length of any cutting edge starting in any axial plane and extending around the tool axis until it again intersects the same plane. The curved cutting edges of the tool roll between opposed tooth faces of the blank in the direction of curvature of such edge and in the direction of inclination of the thread with which the worm wheel teeth are intended to have true generating interaction. In other words, spirally directed cuts are made lengthwise of, not crosswise to, the inclination of the worm wheel teeth. The thread comprises a plurality of continuous convolutions. Each of the cutting edges 7 may be said to comprise sections which lie in a single spiral line so that all of said sections are presented lengthwise to the inclination of the thread.

I claim:—

1. The method of generating worm wheel teeth which consists in rotating a blank and tool at correlated rates of speed, simultaneously effecting a distinct relative movement and making pairs of cuts from opposed faces of adjacent teeth during the period of cutting engagement for each revolution of the blank, said pairs of cuts varying uniformly in one respect and varying differently in another respect.

2. The method of generating worm wheel teeth which consists in rotating a blank and tool at correlated rates of speed, simultaneously effecting a distinct relative movement and continuously making a pair of cuts from opposed faces of one pair of adjacent teeth throughout the period of cutting engagement, said cuts while varying uniformly in distance from each other measured parallel to the tool axis being at equal depths at one particular moment.

3. The method of generating worm wheel teeth which consists in rotating a blank and tool at correlated rates of speed, and causing the latter successively to make groups of non-radial cuts from different tooth sides respectively so that the cuts of each group commence the same distance from the pitch line.

4. The method of generating worm wheel teeth which consists in rotating a blank and tool at correlated rates of speed, and causing the latter to make pairs of cuts successively from different tooth faces and progressively farther away from the axis of the tool and progressively nearer each other.

5. The method of generating worm wheel teeth which consists in rotating a blank and tool at correlated rates of speed, effecting a distinct relative movement between the operative parts, and making a plurality of pairs of like cuts from opposed faces of adjacent teeth respectively, each pair being made toward and progressively nearer the roots of said teeth.

6. The method of generating worm wheel teeth which consists in rotating a toothed blank and threaded tool at correlated rates of speed, effecting a distinct relative movement between the operative parts, and making a plurality of continuously merging cuts simultaneously from each of two tooth faces respectively toward their roots and successively at equal and uniformly varying depths.

7. The method of generating worm wheel teeth which consists in rotating a toothed blank and threaded tool at correlated rates of speed, effecting a distinct relative movement between the operative parts, and making a series of pairs of like cuts successively from different pairs of tooth faces, the like pair of cuts from said faces being made progressively nearer the roots of said teeth respectively.

8. The method of generating worm wheel teeth which consists in rotating a toothed blank and threaded tool at correlated rates of speed, effecting a distinct relative movement between the operative parts, and successively making like pairs of cuts from adjacent gear tooth faces which cuts continuously merge into each other respectively, and progress uniformly together from the tops to the roots of the teeth.

9. The method of generating a worm wheel which consists in rotating a toothed blank and threaded tool in engagement with each other at correlated rates of speed, moving one axially and simultaneously making a pair of different cuts from one pair of adjacent tooth faces and a pair of like cuts from another pair of adjacent tooth faces and in a direction away from their tops.

10. The method of generating a worm wheel which consists in rotating a toothed blank and threaded tool in engagement with each other at correlated rates of speed, moving one axially and successively making first a pair of different cuts from a certain pair of adjacent tooth faces and then a pair of like cuts from the same pair of adjacent tooth faces, cuts being moreover made simultaneously from two adjacent pairs of adjacent faces in a direction from top to bottom.

11. The method of generating a worm wheel tooth which consists in rotating a blank and tool at correlated rates of speed, effecting a distinct relative movement between the operative parts, and causing the latter continuously to make pairs of cuts at equal depths from different tooth faces respectively, each pair of cuts at any given moment having a correspondingly different locational relationship to the pair of cuts which are being made at another moment.

12. The method of generating a worm wheel tooth which consists in rotating a toothed blank and threaded tool at correlated rates of speed, effecting a distinct relative movement between the operative parts, and causing points on the latter to make pair of cuts at equal depths from different tooth faces respectively, the pairs of cuts being made toward and at successive moments progressively nearer to one of the axes of rotation.

13. The method of generating worm wheel teeth which consists in imparting correlated rotational movements to a toothed blank and threaded tool and causing the latter to make a pair of cuts toward the axis and from opposed faces of the blank, which pair of cuts are constantly at equal distances from the axis of the tool, at progressively varying distances from the axis of the blank and each other and along reversed involute curves respectively during the staggered or meshing relation of the nearest edges of the blank and tool.

14. The method of generating worm wheel teeth which consists in imparting correlated rotational movements to a blank and tool effecting a distinct relative movement in a direction parallel to one of the axes of rotation and making pairs of shearing cuts from adjacent tooth faces which progress uniformly in a direction toward, and at any moment are equal distances from, the axis of the blank while the tool intersects the periphery of the blank.

15. The method of generating worm wheel teeth which consists in imparting correlated rotational movements to a blank and tool, moving one of said operative parts along its own axis and making pairs of axially symmetrical cuts from adjacent tooth faces progressively nearer the axis of the blank while the tool intersects the periphery of the blank.

16. The method of generating worm wheel teeth which consists in rotating a blank and tool at correlated rates of speed, and causing a pair of cutting edges disposed with reference to a common axis of rotation to make cuts simultaneously along paths which intersect such axis and which intersect each other.

17. The method of generating worm wheel teeth which consists in rotating a blank and tool at correlated rates of speed, and causing a tool to make at one moment a pair of cuts from adjacent tooth faces toward and at equal distances from the axis of the blank and at another moment to make a cut in continuation of one of said first mentioned cuts from a tooth face in a direction away from said axis.

18. The method of generating worm wheel teeth which consists in rotating a blank and tool at correlated rates of speed, and causing the tool simultaneously to cut from the blank at a plurality of points each disposed in one of a pair of converging lines wound about one of the axes of the tool.

19. The method of generating worm wheel teeth which consists in rotating a toothed blank and threaded tool at correlated rates of speed, and causing the tool simultaneously to make cuts from adjacent tooth sides of the blank at a pair of points lying in converging spiral lines, which points constantly and uniformly vary in distance from one of the axes of rotation.

20. The method of generating worm wheel teeth which consists in rotating a blank and tool at correlated rates of speed, effecting a further movement of one of the parts parallel to the axis of one of the parts and causing the tool simultaneously to make pairs of continuous cuts from the blank at points which are a progressively varying distance from each other and from the axis of said tool.

21. The method of generating worm wheel teeth which consists in rotating a toothed blank and threaded tool at correlated rates of speed, effecting a distinct relative movement between the operative parts, and causing a cut to be made from the sides of the teeth along a line of varying distance from one of the axes of rotation and wound about one of the axes of rotation.

22. The method of generating worm wheel teeth which consists in rotating a toothed blank and threaded tool at correlated rates of speed, effecting a distant relative movement between the operative parts, and causing a cut to be made from the sides of the teeth along a line of varying distance from one of the axes of rotation and extending along one of the axes of rotation.

23. The method of generating worm wheel teeth which consists in rotating a toothed blank and threaded tool at correlated rates of speed, effecting a distinct relative movement between the operative parts, and causing a cut to be made from the sides of the teeth along a line of varying distance from one of the axes of rotation and wound about and extending along one of the axes of rotation.

24. The method of generating worm wheel teeth which consists in rotating a toothed blank and threaded tool at correlated rates of speed, effecting a distinct relative movement between the operative parts, and causing a pair of cuts to be made from adjacent tooth sides along lines of varying distance from one of the axes of rotation and which lines are wound about so as to have different rates of advance along one of the axes of rotation.

25. The method of generating worm wheel teeth which consists in rotating a toothed blank and threaded tool at correlated rates of speed, effecting a distinct relative movement between the operative parts, and causing a continuous cut to be made along a spiral line during the entire period of engagement of the operative parts.

26. The method of generating worm wheel teeth which consists in rotating a toothed blank and threaded tool at correlated rates of speed, effecting a distinct relative movement between the operative parts, and causing a pair of cuts to be made from the sides of the blank's teeth along two spiral lines which converge.

27. The method of generating worm wheel teeth which consists in rotating a toothed blank and threaded tool at correlated rates of speed, effecting a distinct relative movement between the operative parts, and causing a pair of cuts simultaneously to be made along two spiral lines which converge.

28. The method of generating worm wheel teeth which consists in rotating a toothed blank and threaded tool at correlated rates of speed, effecting a distinct relative movement between the operative parts, and causing a pair of cuts to be made from the sides of the blank's teeth along two spiral lines which converge as they recede from a common axis.

29. The method of generating worm wheel teeth which consists in rotating a toothed blank and threaded tool at correlated rates of speed, effecting a distinct relative movement between the operative parts, and causing spirally directed cuts to be made lengthwise to the inclination of the worm wheel teeth.

30. The method of generating worm wheel teeth which consists in rotating a toothed blank and threaded tool at correlated rates of speed, effecting a distinct relative movement between the operative parts, and causing a curved cutting edge of the tool to roll between opposed tooth faces of the blank in the direction of curvature of such edge and in the direction of inclination of the thread with which the worm wheel teeth are intended to have true generating interaction.

Signed by me, this 9th day of April, 1917.

CHARLES H. SCHURR.